United States Patent
Ikuta et al.

(10) Patent No.: US 12,043,513 B2
(45) Date of Patent: Jul. 23, 2024

(54) RECORDING MEDIUM CONVEYANCE DEVICE, RECORDING MEDIUM CONVEYANCE METHOD AND NON-TRANSITORY COMPUTER-READABLE RECORDING MEDIUM ENCODED WITH RECORDING MEDIUM CONVEYANCE INSTRUCTIONS

(71) Applicant: Konica Minolta, Inc., Tokyo (JP)

(72) Inventors: Katsuyuki Ikuta, Hamamatsu (JP); Hiroaki Takatsu, Nishio (JP); Takeshi Tamada, Toyohashi (JP); Takahiro Tsujimoto, Toyokawa (JP); Akihiro Hayashi, Okazaki (JP)

(73) Assignee: Konica Minolta, Inc., Tokyo (JP)

( * ) Notice: Subject to any disclaimer, the term of this patent is extended or adjusted under 35 U.S.C. 154(b) by 526 days.

(21) Appl. No.: 17/333,432

(22) Filed: May 28, 2021

(65) Prior Publication Data
US 2021/0371223 A1 Dec. 2, 2021

(30) Foreign Application Priority Data
May 29, 2020 (JP) .................. 2020-094863

(51) Int. Cl.
*B65H 7/12* (2006.01)
*H04N 1/00* (2006.01)

(52) U.S. Cl.
CPC ......... *B65H 7/125* (2013.01); *H04N 1/00702* (2013.01); *H04N 1/00724* (2013.01);
(Continued)

(58) Field of Classification Search
CPC ................ B65H 7/125; B65H 2553/30; H04N 1/00702; H04N 1/00724; H04N 1/00729; H04N 1/00766; H04N 1/00779
See application file for complete search history.

(56) References Cited

U.S. PATENT DOCUMENTS

2013/0069299 A1\* 3/2013 Matsuoka ................ B65H 5/06
271/225

FOREIGN PATENT DOCUMENTS

| JP | 2006-124063 A | 5/2006 |
|---|---|---|
| JP | 2007-168928 A | 7/2007 |

(Continued)

OTHER PUBLICATIONS

Machine translation of JP2015-78039. (Year: 2015).\*
(Continued)

*Primary Examiner* — Thomas A Morrison
(74) *Attorney, Agent, or Firm* — Osha Bergman Watanabe & Burton LLP

(57) ABSTRACT

A recording medium conveyance device includes a storage, a conveyer that conveys a conveyed object, an ultrasonic sensor that outputs a value indicating an attenuation amount of an ultrasonic wave caused by the conveyed object, and a hardware processor. The hardware processor executes a type detection process of detecting a type of the conveyed object based on output of the ultrasonic sensor and storing the type in the storage and an overlay detection process of detecting whether the conveyed object is in an overlay state in which a gap is present based on output of the ultrasonic sensor, and switches to either one of the type detection process and the overlay detection process. The hardware processor executes the type detection process when the type is not stored in the storage and executes the overlay detection process when the type is stored in the storage.

19 Claims, 9 Drawing Sheets

(52) U.S. Cl.
CPC ..... *H04N 1/00729* (2013.01); *H04N 1/00766* (2013.01); *H04N 1/00779* (2013.01); *B65H 2553/30* (2013.01)

(56) References Cited

FOREIGN PATENT DOCUMENTS

| | | |
|---|---|---|
| JP | 2011046539 A | 3/2011 |
| JP | 2013063843 A | 4/2013 |
| JP | 2013177223 A | 9/2013 |
| JP | 2015-78039 * | 4/2015 |
| JP | 2019-148673 A | 9/2019 |

OTHER PUBLICATIONS

Office Action issued in corresponding Japanese Patent Application No. 2020-094863, dated Jan. 30, 2024, with translation (12 pages).

* cited by examiner

RECORDING MEDIUM CONVEYANCE DEVICE, RECORDING MEDIUM CONVEYANCE METHOD AND NON-TRANSITORY COMPUTER-READABLE RECORDING MEDIUM ENCODED WITH RECORDING MEDIUM CONVEYANCE INSTRUCTIONS

CROSS REFERENCE TO RELATED APPLICATIONS

The entire disclosure of Japanese patent Application No. 2020-094863 filed on May 29, 2020, is incorporated herein by reference in its entirety.

BACKGROUND

Technical Field

The present invention relates to a recording medium conveyance device, a recording medium conveyance method and a non-transitory computer-readable recording medium encoded with a recording medium conveyance program. In particular, the present invention relates to a recording medium conveyance device that detects double feeding of a recording medium, a recording medium conveyance method executed in the recording medium conveyance device and a non-transitory computer-readable recording medium encoded with a recording medium conveyance program that causes a computer to execute the recording medium conveyance method.

Related Art

In an image forming apparatus such as an MFP (Multi Function Peripheral), papers are taken out one by one from a cassette storing a plurality of papers to be conveyed, and an image is formed on a paper being conveyed. When a paper is taken out from the cassette, a plurality of papers may be overlaid on one another. An ultrasonic sensor has been known as a sensor for detecting overlaying of a plurality of papers. The ultrasonic sensor detects an attenuation rate of an ultrasonic wave that has transmitted through a measured object. In the case where there is a gap between a plurality of papers, the attenuation rate is significantly reduced as compared to the case of one sheet of paper.

Meanwhile, a recording medium on which an image is to be formed by the MFP is not limited to one sheet of paper, and there is an overlay paper such as an envelope in which two papers are overlaid on each other. Japanese Patent Laid-Open No. 2007-168928 describes a sheet carrying unit that includes a double feed detecting means for detecting double feed of sheets and a stopping means for stopping carrying of a sheet based on a detection result of the double feed detecting means, and includes an accepting means for accepting a type of a sheet to be carried, wherein the stopping means is characterized in being configured to stop carrying a sheet based on the type of sheet accepted by the accepting means and a detection result of the double feed detecting means.

However, with the sheet carrying unit described in Japanese Patent Laid-Open No. 2007-168928, a type of a sheet to be carried is required to be input to the sheet carrying unit. Therefore, a user is required to set a type of a sheet in advance, and a user operation is complicated. Further, in the case where the type of a sheet to be carried is not set, an envelope is misjudged as being double fed. Therefore, there may be misjudgments.

SUMMARY

According to one or more embodiments, a recording medium conveyance device includes a storage, a conveyer that conveys a conveyed object, an ultrasonic sensor that outputs a value indicating an attenuation amount of an ultrasonic wave caused by the conveyed object, and a hardware processor, wherein the hardware processor executes a type detection process of detecting a type of the conveyed object based on output of the ultrasonic sensor and storing the type in the storage and an overlay detection process of detecting whether the conveyed object is in an overlay state in which a gap is present based on output of the ultrasonic sensor, and switches to either one of the type detection process and the overlay detection process, and the hardware processor executes the type detection process in the case where the type is not stored in the storage and executes the overlay detection process in the case where the type is stored in the storage.

According to one or more embodiments, a recording medium conveyance method is executed in an image forming apparatus, wherein the image forming apparatus includes a storage, a conveyer that conveys a conveyed object, and an ultrasonic sensor that outputs a value indicating an attenuation amount of an ultrasonic wave caused by the conveyed object, and the recording medium conveyance method includes a type detection step of executing a type detection process of detecting a type of the conveyed object based on output of the ultrasonic sensor and storing the type in the storage, an overlay detection step of executing an overlay detection process of detecting whether the conveyed object is in an overlay state in which a gap is present based on a result of output of the ultrasonic sensor, and a switching step of executing either one of the type detection process and the overlay detection process, and the switching step includes executing the type detection process in the case where the type is not stored in the storage, and executing the overlay detection process in the case where the type is stored in the storage.

According to one or more embodiments, a non-transitory computer-readable recording medium is encoded with recording medium conveyance instructions executed in a computer that controls an image forming apparatus, wherein the image forming apparatus includes a storage, a conveyer that conveys a conveyed object, and an ultrasonic sensor that outputs a value indicating an attenuation amount of an ultrasonic wave caused by the conveyed object, and the recording medium conveyance instructions cause the computer to execute a type detection step of executing a type detection process of detecting a type of the conveyed object based on a result of output of the ultrasonic sensor and executing a type detection process of storing the type in the storage, an overlay detection step of executing an overlay detection process of detecting whether the conveyed object is in an overlay state in which a gap is present based on a result of output of the ultrasonic sensor, and a switching step of executing either one of the type detection process and the overlay detection process, and the switching step includes executing the type detection process in the case where the type is not stored in the storage, and executing the overlay detection process in the case where the type is stored in the storage.

BRIEF DESCRIPTION I/F THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION

Figure 1:
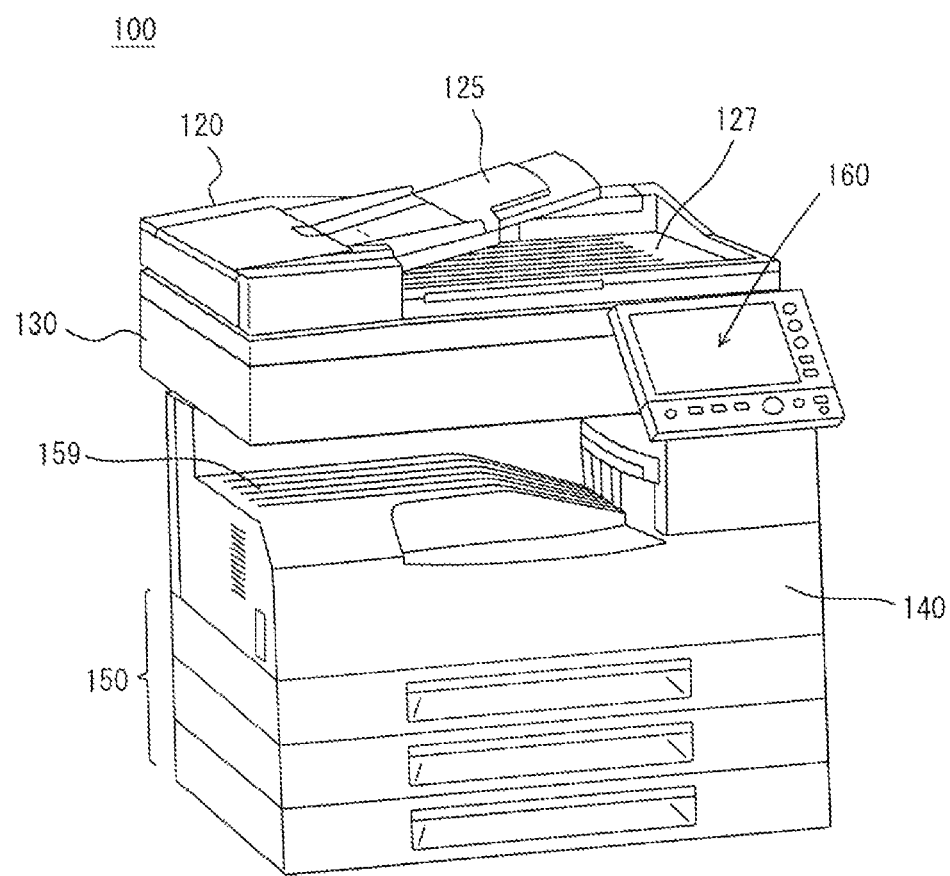
FIG. 1 is a perspective view showing the appearance of an MFP according to one or more embodiments.

Hereinafter, embodiments of the present invention will be described with reference to the drawings. However, the scope of the invention is not limited to the disclosed embodiments.

An image forming apparatus in one or more embodiments of the present invention will be described below with reference to the drawings. In the following description, the same parts are denoted with the same reference characters. Their names and functions are also the same. Thus, a detailed description thereof will not be repeated. Further, in the following description, an MFP is explained as one example of the image forming apparatus. Further, in the MFP described below, a paper (a sheet of paper) such as a plain paper, a wood free paper, a recycled paper or a photo paper, or an overlay paper having two sheets of paper being overlaid on each other similarly to an envelope, is used as a recording medium on which an image is to be formed.

Figure 2:
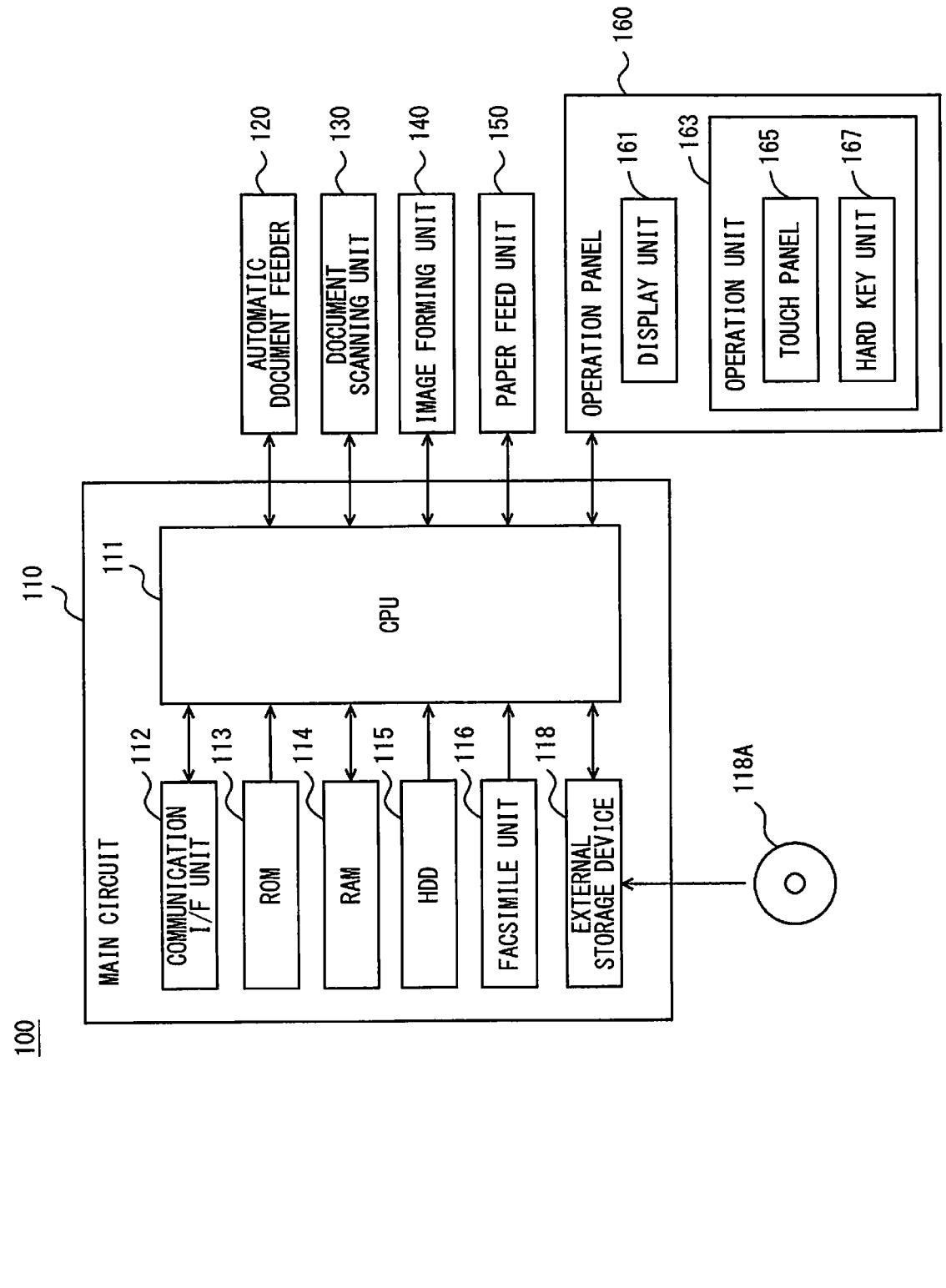
FIG. 2 is a block diagram showing the overview of a hardware configuration of the MFP.

FIG. 1 is a perspective view showing the appearance of the MFP according to one or more embodiments. FIG. 2 is a block diagram showing the overview of the hardware configuration of the MFP. With reference to FIGS. 1 and 2, the MFP 100 is one example of the image forming apparatus, and includes a main circuit 110, a document scanning unit 130 for scanning a document, an automatic document feeder 120 for conveying a document to the document scanning unit 130, an image forming unit 140 for forming an image on a recording medium based on image data, a paper feed unit 150 for supplying a recording medium to the image forming unit 140 and an operation panel 160 serving as a user interface.

The automatic document feeder 120 automatically conveys a plurality of documents set on a document tray 125 to a document scanning position of the document scanning unit 130 one by one, and discharges a document having an image formed thereon and scanned by the document scanning unit 130 onto a document discharge tray 127. The automatic document feeder 120 includes a document detection sensor for detecting a document placed on the document tray 125.

The document scanning unit 130 has a rectangular scanning surface for scanning a document. The scanning surface is formed of a platen glass, for example. The automatic document feeder 120 is connected to the main body of the MFP 100 to be rotatable about an axis parallel to one side of the scanning surface, and is openable and closable. The document scanning unit 130 is arranged below the automatic document feeder 120, and the scanning surface of the document scanning unit 130 is exposed with the automatic document feeder 120 rotated and open. Thus, a user can place a document on the scanning surface of the document scanning unit 130. The automatic document feeder 120 can change between an open state in which the scanning surface of the document scanning unit 130 is exposed and a close state in which the scanning surface is covered. The automatic document feeder 120 includes a state detection sensor for detecting the open state of the automatic document feeder 120.

The document scanning unit 130 includes a light source that emits light and an optoelectronic transducer that receives light, and scans an image formed on a document placed on the scanning surface. In the case where a document is placed on a scan region, the light emitted from the light source is reflected from the document, and the reflected light forms an image on the optoelectronic transducer. When receiving the light reflected from the document, the optoelectronic transducer produces image data by converting the received light into an electrical signal. The document scanning unit 130 outputs the image data to a CPU 111 included in the main circuit 110.

The paper feed unit 150 takes out a recording medium stored in any of first to third paper feed trays and a manual paper feed tray, described below, and conveys the recording medium to the image forming unit 140 as a conveyed object.

The image forming unit 140 is controlled by the CPU 111 and forms an image on the conveyed object that is conveyed by the paper feed unit 150 using a well-known electrophotographic method. In one or more embodiments, the image forming unit 140 forms an image of image data input from the CPU 111 on the conveyed object conveyed by the paper feed unit 150. The conveyed object on which the image is formed is discharged to the paper discharge tray 159. The image data that is output by the CPU 111 to the image forming unit 140 includes image data such as externally received print data in addition to image data input from the document scanning unit 130.

The main circuit 110 includes a CPU (Central Processing Unit) 111 for controlling the MFP 100 as a whole, a communication interface (I/F) unit 112, a ROM (Read Only Memory) 113, a RAM (Random Access Memory) 114, a Hard Disc Drive (HDD) 115 that is used as a mass storage device, a facsimile unit 116 and an external storage device 118. The CPU 111 is connected to the automatic document feeder 120, the document scanning unit 130, the image forming unit 140, the paper feed unit 150 and the operation panel 160, and controls the MFP 100 as a whole.

The ROM 113 stores instructions executed by the CPU 111 or data required to execute the instructions. The RAM 114 is used as a work area for execution of instructions by the CPU 111. Further, the RAM 114 temporarily stores image data successively transmitted from the document scanning unit 130.

The operation panel 160 is provided in an upper part of the MFP 100. The operation panel 160 includes a display unit 161 and an operation unit 163. The display unit 161 is a Liquid Crystal Display (LCD), for example, and displays an instruction menu for the user, information about acquired image data, etc. As long as displaying images, an organic EL (Electroluminescence) display, for example, can be used instead of an LCD.

The operation unit 163 includes a touch panel 165 and a hard key unit 167. The touch panel 165 is a capacitance type. The touch panel 165 is not limited to the capacitance type, and another type such as a resistive film type, a surface acoustic wave type, an infrared type and an electromagnetic induction type can be used.

The touch panel 165 is provided with its detection surface being overlaid on an upper surface or a lower surface of the display unit 161. Here, the size of the detection surface of the touch panel 165 and the size of the display surface of the display unit 161 are the same. Therefore, the coordinate system of the display surface and the coordinate system of the detection surface are the same. The touch panel 165 detects the position designated by the user on the display surface of the display unit 161 using the detection surface, and outputs a set of coordinates of the detected position to the CPU 111. Because the coordinate system of the display surface and the coordinate system of the detection surface are the same, the set of coordinates output by the touch panel 165 can be replaced with the set of coordinates of the display surface.

The hard key unit 167 includes a plurality of hard keys. The hard keys are contact switches, for example. The touch panel 165 detects a position designated by the user on the display surface of the display unit 161. In the case where operating the MFP 100, the user is likely to be in an upright attitude. Therefore, the display surface of the display unit 161, an operation surface of the touch panel 165 and the hard key unit 167 are arranged to face upward. This is for the purpose of enabling the user to easily view the display surface of the display unit 161 and easily provide an instruction on the operation unit 163 with his or her finger.

The communication I/F unit 112 is an interface for connecting the MFP 100 to a network. The communication I/F unit 112 communicates with another computer or a data processing apparatus connected to the network with a communication protocol such as TCP (Transmission Control Protocol) or FTP (File Transfer Protocol). The network to which the communication I/F unit 112 is connected is a Local Area Network (LAN), either wired or wireless. Further, the network is not limited to a LAN and may be a Wide Area Network (WAN), a Public Switched Telephone Network (PSTN), the Internet or the like.

The facsimile unit 116 is connected to the Public Switched Telephone Networks (PSTN) and transmits facsimile data to or receives facsimile data from the PSTN. The facsimile unit 116 stores the received facsimile data in the HDD 115, converts the facsimile data into print data that is printable in the image forming unit 140, and outputs the data to the image forming unit 140. Thus, the image forming unit 140 forms an image represented by the facsimile data received from the facsimile unit 116 on a paper. Further, the facsimile unit 116 converts the data stored in the HDD 115 into facsimile data, and transmits the facsimile data to a facsimile machine connected to the PSTN.

The external storage device 118 is controlled by the CPU 111 and mounted with a CD-ROM (Compact Disk Read Only Memory) 118A or a semiconductor memory. While the CPU 111 executes instructions stored in the ROM 113 by way of example in one or more embodiments, the CPU 111 may control the external storage device 118, read instructions to be executed by the CPU 111 from the CD-ROM 118A and store the read program in the RAM 114 for execution.

It is noted that a recording medium for storing the instructions executed by the CPU 111 is not limited to the CD-ROM 118A. It may be a flexible disc, a cassette tape, an optical disc (MO (Magnetic Optical Disc)/MD (Mini Disc)/DVD (Digital Versatile Disc)), an IC card, an optical card, and a semiconductor memory such as a mask ROM and an EPROM (Erasable Programmable ROM). Further, the CPU 111 may download instructions from a computer connected to the network and store the instructions in the HDD 115, or the computer connected to the network may write the instructions in the HDD 115. Then, the instructions stored in the HDD 115 may be loaded into the RAM 114 to be executed by the CPU 111. The instructions referred to here includes not only instructions directly executable by the CPU 111 but also a source program, a compressed program, an encrypted program and the like.

Figure 3:
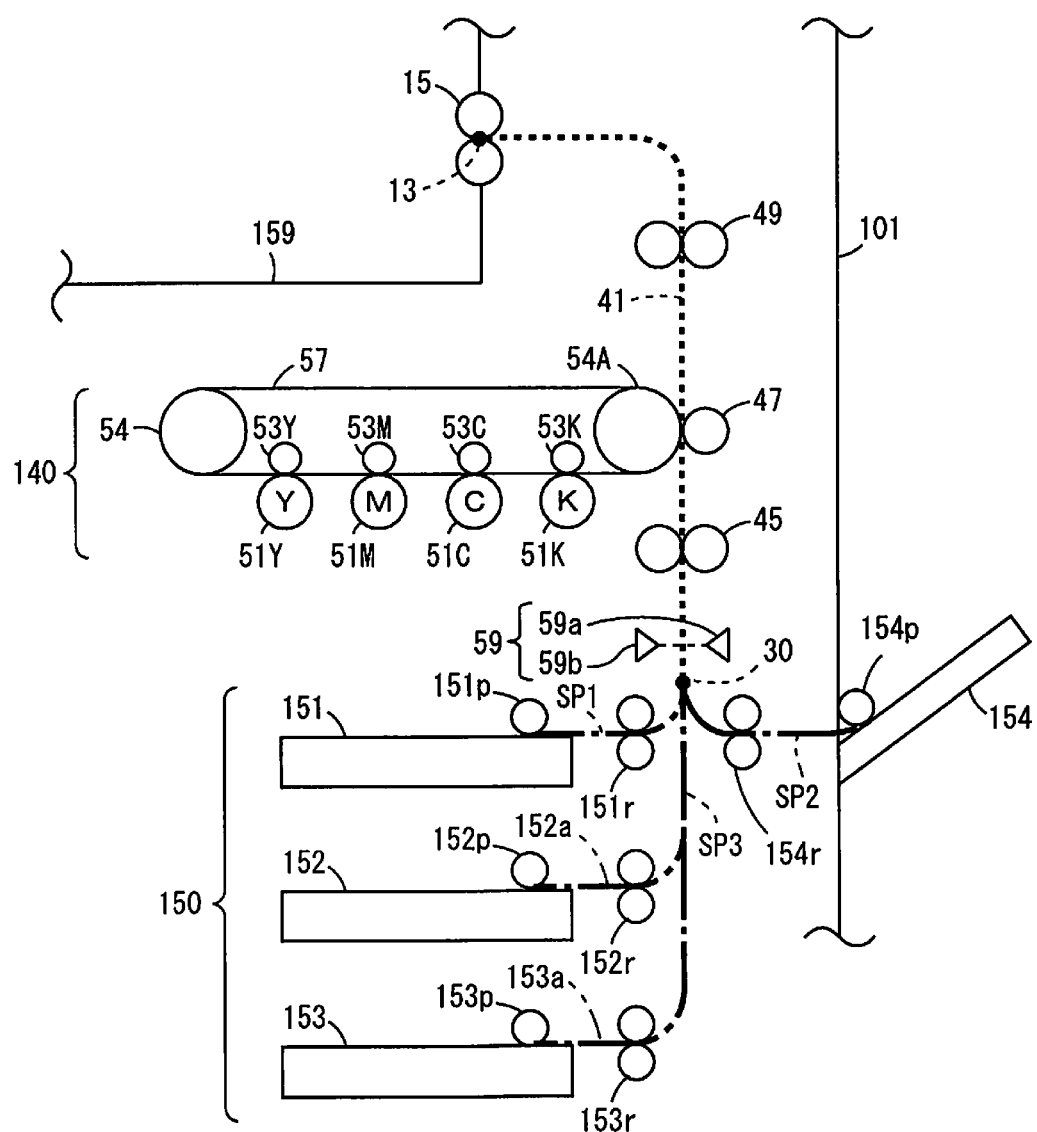
FIG. 3 is a schematic side view showing the inner configuration of part of an image forming unit and a paper feed unit.

FIG. 3 is a schematic side view showing the inner configuration of part of the image forming unit and the paper feed unit. With reference to FIG. 3, a main conveyance path 41 indicated by the thick dotted line is formed to basically extend in an up-and-down direction in the MFP 100. The main conveyance path 41 is the path for guiding a paper that is conveyed from the paper feed unit 150 to the paper discharge tray 159 through the image forming unit 140. In the main conveyance path 41 of the present example, a lower end 30 opposite to an upper end 13 located at a position farther upward than the image forming unit 140 constitutes an inlet port for receiving papers from the paper feed unit 150. Further, the upper end 13 of the main conveyance path 41 constitutes a discharge port for discharging papers on which images have been formed to the paper discharge tray 159. A paper discharge roller 15 is provided at the upper end 13 of the main conveyance path 41. The lower end 30 of the main conveyance path 41 is connected to a plurality of sub-conveyance paths SP1, SP2, SP3 of the paper feed unit 150, described below.

The paper feed unit 150 includes the three paper feed trays 151, 152, 153 and the manual paper feed tray 154. The three paper feed trays 151, 152, 153 are arranged in a stack in this order from above toward below. The manual paper feed tray 154 is provided at a sidewall 101 of the MFP 100 and located at a position farther downward than the image forming unit 140. As indicated by a thick one-dot and dash line in FIG. 3, a sub-conveyance path SP1 is formed to extend from the paper feed tray 151, which is the top tray among the three paper feed trays 151, 152, 153, to the lower end 30 of the main conveyance path 41. Further, a sub-conveyance path SP2 is formed to extend from the manual paper feed tray 154 to the lower end 30 of the main conveyance path 41. Further, two sub-conveyance paths 152a, 153a that respectively extend from the paper feed trays 152, 153, which are the middle and bottom trays among the three paper feed trays 151, 152, 153, to the lower end 30 of the main conveyance path 41 are formed. The portion having a predetermined length from the lower end 30 of the main conveyance path 41 to the point where the main conveyance path 41 branches into the two sub-conveyance paths 152a, 153a is a sub-conveyance path SP3, which is shared by the two sub-conveyance paths 152a, 153a.

A pickup roller 151p and a paper feed roller 151r are provided to correspond to the paper feed tray 151. The paper feed roller 151r is provided on the sub-conveyance path SP1. A pickup roller 152p and a paper feed roller 152r are provided to correspond to the paper feed tray 152. The paper feed roller 152r is provided on the sub-conveyance path 152a. A pickup roller 153p and a paper feed roller 153r are provided to correspond to the paper feed tray 153. The paper feed roller 153r is provided on the sub-conveyance path 153a. A pickup roller 154p and a paper feed roller 154r are provided to correspond to the manual paper feed tray 154. The paper feed roller 154r is provided on the sub-conveyance path SP2. Taking out a recording medium from each of the paper feed trays 151, 152, 153 and the manual paper feed tray 154 and conveying the recording medium are common behavior among the paper feed trays 151, 152, 153 and the manual paper feed tray 154. A recording medium is taken from the paper feed tray 151, by way of example.

In the paper feed tray 151, one or more recording media are stored in a stack. The paper feed tray 151 has a lift-up mechanism that lifts the one or more stored recording media. The pickup roller 151p is biased by an elastic member such as a spring to abut against the recording medium at the top among the one or more recording media stored in the paper feed tray 151 from above. The pickup roller 151p presses the recording medium from above. The pickup roller 151p rotates, so that the recording medium at the top is sent out to the sub-conveyance path SP1 by a friction force between the pickup roller 151p and the recording medium. The recording medium sent out to the sub-conveyance path SP1 is supplied to the main conveyance path 41 by the paper feed roller 151r as a conveyed object. Hereinafter, a recording medium that is sent out to the sub-conveyance path SP1 by the pickup roller 151p and conveyed by the paper feed roller 151r is referred to as a conveyed object.

With the rotation of the pickup roller 151p, the recording medium at the top among the one or more recording media stored in the paper feed tray 151 is sent out to the sub-conveyance path SP1 due to friction between the pickup roller 151p and the recording medium. A recording medium that is the second from the top and overlaps with the recording medium at the top receives a friction force from the recording medium at the top, and receives a friction force from a recording medium that is the third from the top and overlaps with the recording medium that is the second from the top. Therefore, a force that biases the pickup roller 151p is adjusted such that only the recording medium at the top is sent out to the sub-conveyance path SP1. However, the recording medium that is the second or subsequent to the second from the top may be sent out to the sub-conveyance path SP1 together with the recording medium at the top by the pickup roller 151p due to a change in environment in the MFP 100. In this case, two or more recording media in an overlay state in which two or more recording media are overlaid on one another are conveyed through the sub-conveyance path SP1 by the paper feed roller 151r. In this manner, the paper feed unit 150 may convey a conveyed object constituted by one recording medium or may convey a conveyed object that is constituted by two or more recording media overlaid on one another. Hereinafter, conveyance of a conveyed object constituted by one recording media is referred to as single feed, and conveyance of a conveyed object constituted by two or more recording media overlaid on one another is referred to as double feed.

In the MFP 100, during image formation, a tray storing a recording medium on which an image is to be formed is selected from among the three paper feed trays 151, 52, 153 and the manual paper feed tray 154 as a subject tray. A pickup roller and a paper feed roller corresponding to a tray selected as a subject tray from among the three paper feed trays 151, 152, 153 and the manual paper feed tray 154 behave, whereby a conveyed object is supplied to the main conveyance path 41 through any of the sub-conveyance paths SP1, SP2, SP3 from a tray selected as a subject tray.

The image forming unit 140 includes respective image forming units 51Y, 51M, 51C, 51K for respective yellow, magenta, cyan and black. At least one of the image forming units 51Y, 51M, 51C, 51K is driven, so that an image is formed on a conveyed object. When all of the image forming units 51Y, 51M, 51C, 51K are driven, a full color image is formed. Printing data pieces for yellow, magenta, cyan and black are respectively input to the image forming units 51Y, 51M, 51C, 51K. The only difference among the image forming units 51Y, 51M, 51C, 51K is the color of tonner used by the image forming units 51Y, 51M, 51C, 51K. Here, the image forming unit 51Y for forming an image in yellow will be described.

The image forming unit 51Y includes an exposure head to which printing data for yellow is input, a photoreceptor drum (an image carrier), an electric charger, a developer and a transfer roller 53Y. The exposure head emits laser light in accordance with the received printing data (an electrical signal). A polygon mirror included in the exposure head scans the emitted laser light one-dimensionally to expose the photoreceptor drum. The direction in which the laser light one-dimensionally scans the photoreceptor drum is a main scan direction. After being electrically charged by the electric charger, the photoreceptor drum is irradiated with the laser light emitted by the exposure head. Thus, an electrostatic latent image is formed on the photoreceptor drum. Subsequently, toner is applied onto the electrostatic latent image by the developer, and a toner image is formed. The toner image formed on the photoreceptor drum is transferred onto an intermediate transfer belt 57 by the transfer roller 53Y.

On the other hand, the intermediate transfer belt 57 is suspended by a driving roller 54 and a roller 55A not to loosen. When the driving roller 54 rotates in an anti-clockwise direction in the diagram, the intermediate transfer belt 57 rotates in the anti-clockwise direction at a predetermined speed. The roller 54A rotates in the anti-clockwise direction due to the rotation of the intermediate transfer belt 57.

Thus, the image forming units 51Y, 51M, 51C, 51K sequentially transfer toner images onto the intermediate transfer belt 57. Timing for transferring toner images onto the intermediate transfer belt 57 by the respective image forming units 51Y, 51M, 51C, 51K is adjusted by detection of a reference mark provided on the intermediate transfer belt 57. Thus, toner images in yellow, magenta, cyan and black are superimposed on the intermediate transfer belt 57.

In the above-mentioned main conveyance path 41, a timing roller 45, a transfer roller 47 and a fuser roller 49 are arranged in this order at intervals from the lower end 30 to the upper end 13. A conveyed object that has been supplied from the paper feed unit 150 to the main conveyance path 41 is sent to the timing roller 45.

The timing roller 45 adjusts the conveyance state of the conveyance object in the main conveyance path 41 such that the conveyed object arrives at the transfer roller 47 at a point in time at which a toner image formed on the intermediate transfer belt 57 arrives at the transfer roller 47. The conveyed object conveyed by the timing roller 45 is pressed against the intermediate transfer belt 57 by the transfer roller 47, and the transfer roller 47 is electrically charged. Thus, toner images in yellow, magenta, cyan and black that are formed on the intermediate transfer belt 57 in a superimposed manner are transferred to the conveyed object. The voltage applied to the transfer roller 47 is controlled by the CPU 111 such that an electric charge amount of the transfer roller 47 is a value suitable for the basis weight of the conveyed object.

The conveyed object to which the toner image has been transferred is conveyed to the fuser roller 49 and heated by the fuser roller 49. Thus, the toner is fused and fixed to the conveyed object. Thereafter, the conveyed object on which the image has been formed is discharged onto the paper discharge tray 159 from the upper end 13 of the main conveyance path 41 by the paper discharge roller 15. The temperature of the fuser roller 49 is controlled by the CPU 111 to be the value suitable for the basis weight of the conveyed object.

In the MFP 100 according to one or more embodiments, an ultrasonic sensor 59 having a detection region in the main conveyance path 41 is provided. The ultrasonic sensor 59 includes an ultrasonic wave transmitter 59a and an ultrasonic wave receiver 59b and is transmissive. The ultrasonic sensor 59 is arranged such that the ultrasonic wave transmitter 59a and the ultrasonic wave receiver 59b are arranged between the lower end 30 of the main conveyance path 41 and the timing roller 45 to be opposite to each other with the main conveyance path 41 provided therebetween. The ultrasonic wave transmitter 59a includes a piezoelectric element, a drive circuit of the piezoelectric element and transmits an ultrasonic wave. The ultrasonic wave receiver 59b includes the piezoelectric element and a detection circuit for detecting an electromotive force generated in the piezoelectric element, and detects the electromotive force generated in the piezoelectric element by the ultrasonic wave transmitted from the ultrasonic wave transmitter 59a. The region in the main conveyance path 41 between the ultrasonic wave transmitter 50a and the ultrasonic wave receiver 59b is the detection region.

The ultrasonic sensor 59 causes the ultrasonic wave transmitter 59a to transmit an ultrasonic wave with a predetermined volume to the detection region from the ultrasonic wave transmitter 59a. A conveyed object travels to cross the detection region with the ultrasonic wave transmitter 59a transmitting an ultrasonic wave to the detection region, whereby the ultrasonic wave hits a portion of the travelling conveyed object. At this time, part of the ultrasonic wave that has hit the conveyed object is transmitted through the conveyed object, and the rest of the ultrasonic wave is absorbed by the conveyed object or reflected from the conveyed object. The ultrasonic wave receiver 59b receives the ultrasonic wave that has been transmitted through the conveyed object, and outputs a signal corresponding to the volume of the received ultrasonic wave to the CPU 111. Here, the ultrasonic sensor 59 outputs a value indicating an attenuation amount of the ultrasonic wave. Here, the value indicating an attenuation amount of an ultrasonic wave is referred to as an attenuation rate. An attenuation rate indicates the rate of a volume of an ultrasonic wave that is transmitted through a conveyed object with respect to the volume of the transmitted ultrasonic wave. Further, a value indicating an attenuation amount of an ultrasonic wave may be a value obtained by subtraction of a receipt volume from a transmission volume.

An attenuation rate of ultrasonic wave differs depending on a basis amount of paper, and there is a predetermined relationship between the attenuation rate of ultrasonic wave and the basis weight of paper. The larger a basis weight of a paper is, the smaller an attenuation rate of an ultrasonic wave is. Therefore, the relationship between a basis weight of a paper and an attenuation rate of an ultrasonic wave is obtained by an experiment or the like in advance. Thus, a basis amount of a paper is determined from an attenuation rate of an ultrasonic wave.

In regard to an attenuation rage of an ultrasonic wave, there is a significant difference between a paper and an overlay paper. This is because two papers are overlaid on each other in an overlay paper. When two papers are overlaid on each other, a gap is present between the two papers. Therefore, the attenuation rate of an ultrasonic wave in regard to an overlay paper is significantly small as compared to an attenuation rate of an ultrasonic wave in regard to one paper. An attenuation rate of two papers that are overlaid on each other and has the smallest basis weight is smaller than an attenuation rate of a paper having the largest basis weight. Therefore, presence or absence of a gap can be detected based on an attenuation rate of an ultrasonic wave.

Further, presence or absence of a conveyed object may be detected based on an attenuation rate of an ultrasonic wave. Therefore, a position of a conveyed object may be detected based on an output value of the ultrasonic sensor 59. In this manner, the ultrasonic sensor 59 can function as a position detection sensor that detects a position of a conveyed object.

Figure 4:
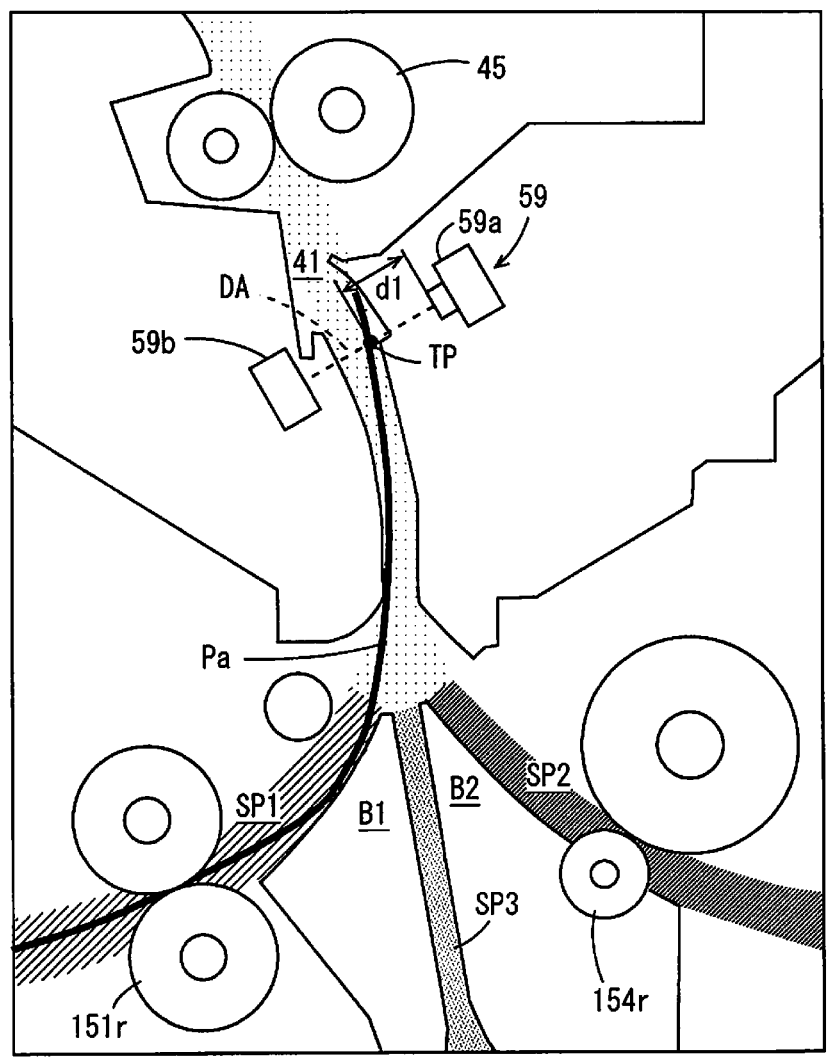
FIG. 4 is a side view showing a detection region in a conveyance path.

FIG. 4 is a side view showing the detection region in the conveyance path. In FIG. 4, two types of different hatching patterns are applied to the sub-conveyance paths SP1, SP2, and two types of different dotted patterns are applied to the main conveyance path 41 and the sub-conveyance path SP3 in order to facilitate understanding of the shapes of the main conveyance path 41 and the plurality of sub-conveyance paths SP1, SP2, SP3 and their positional relationship. Further, part of a conveyed object pa that travels through the main conveyance path 41 is shown. Here, single feed conveyance of the conveyed object pa is shown, by way of example.

As indicated by the dotted line in FIG. 4, the ultrasonic sensor 59 is arranged to have a detection region DA in the main conveyance path 41. The detection region DA of the ultrasonic sensor 59 extends in the direction that intersects with the direction in which the conveyed object pa travels and intersects with the conveyed object pa that travels through the main conveyance path 41. In the detection region DA, a target position TP is set at a position that is spaced apart from the ultrasonic wave transmitter 59a by a predetermined distance dl and is on a line that connects the ultrasonic wave transmitter 59a and the ultrasonic wave receiver 59b. The target position TP is an ideal position through which the conveyed object pa that travels through the main conveyance path 41 is to pass in the detection region DA for detection of a basis weight.

A distance L1 from the paper feed tray 151 to the detection region DA, a distance L2 from the paper feed tray 152 to the detection region DA, a distance L3 from the paper feed tray 153 to the detection region DA and a distance L4 from the manual paper feed tray 154 to the detection region DA are predetermined values. Further, with use of a conveyance speed at which a conveyed object is conveyed, a period of time required for the conveyed object conveyed from any of the paper feed trays 151, 152, 153 and the manual paper feed tray 154 to arrive at the detection region DA is obtained. Therefore, the timing for detecting an attenuation rate by the ultrasonic sensor 59 is obtained on the basis of a point in time at which conveyance of a conveyed object is started from any of the paper feed trays 152, 152, 153 and the manual paper feed tray 154.

Figure 5:
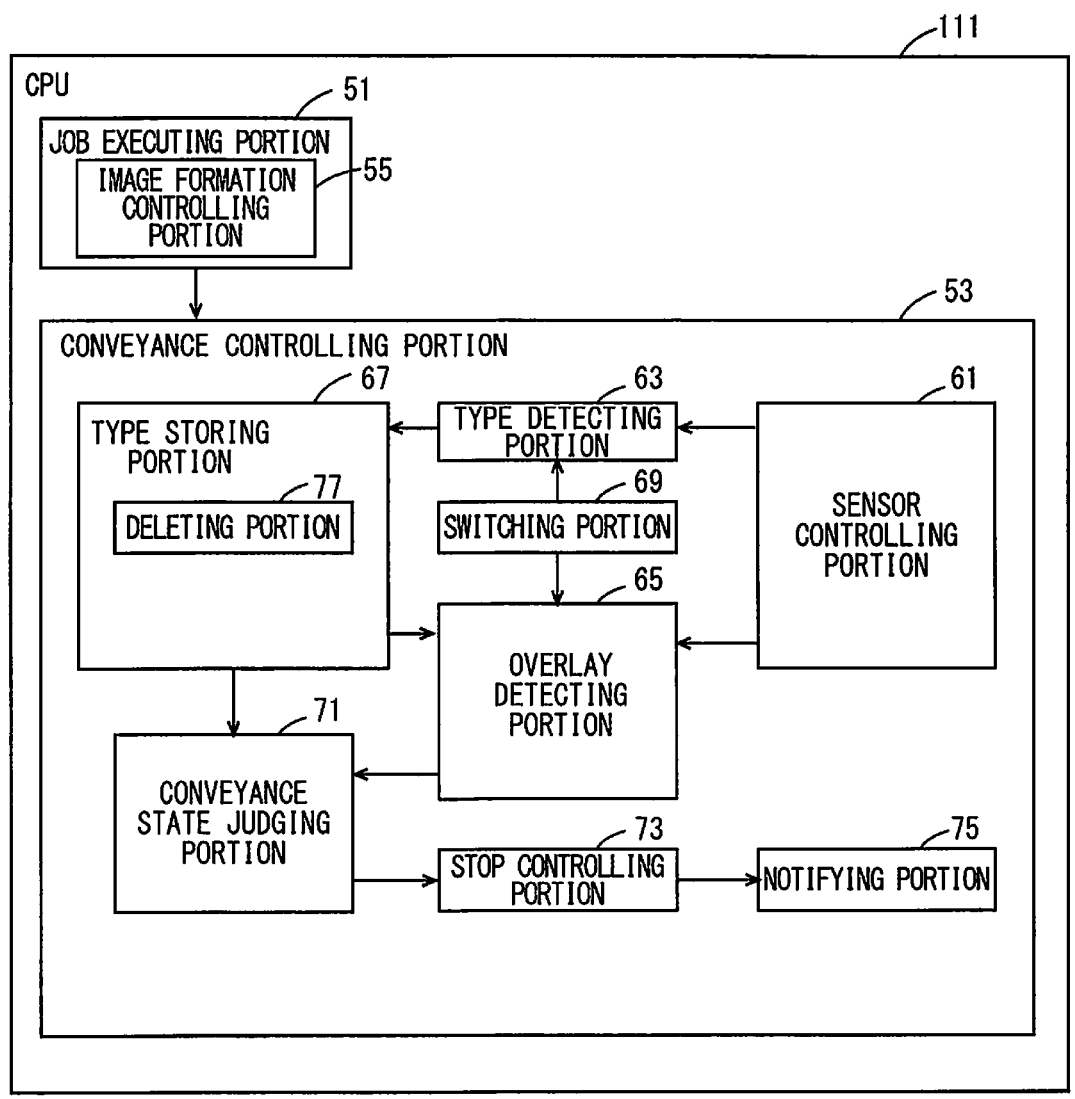
FIG. 5 is a diagram showing one example of functions of a CPU of an MFP according to one or more embodiments.

FIG. 5 is a diagram showing one example of the functions of the CPU of the MFP in one or more embodiments. The functions shown in FIG. 5 are implemented by the CPU 111 in the case where the CPU 111 included in the MFP 100 executes recording medium conveyance instructions stored in the ROM 113, the HDD 115 or the CD-ROM 118A. With reference to FIG. 5, the CPU 111 includes a job executing portion 51 and a conveyance controlling portion 53.

The job executing portion 51 executes a print job and generates printing data used to form an image by the image forming unit 140. In the case where executing a print job, the job executing portion 51 generates printing data based on data subject to image formation in accordance with a print condition. In the case where the communication I/F unit 112 receives a print job from an external computer, for example, the job executing portion 51 executes a print job. A print job is written in PJL (Printer Job Language) or PCL (Printer Control Language), for example, and includes a print condition and data subject to image formation. Further, in the case where the user operates the operation unit 163, the job executing portion 51 executes a job designated by the user. The job designated by the user includes a print condition and data subject to image formation. The data subject to image formation is the data designated by the user. The data designated by the user includes image data output by the document scanning unit 130 that has scanned a document, data stored in the HDD 115 and data stored in an external computer.

Printing data is bitmap data, for example. The printing data corresponds to the size of a paper on which an image is to be formed and defines an image to be formed on a paper by a plurality of pixel values. The printing data includes four data pieces respectively corresponding to yellow, magenta, cyan and black. Therefore, in the case where having a plurality of pages, the printing data includes four data pieces respectively corresponding to yellow, magenta, cyan and black for each of the plurality of pages.

The conveyance controlling portion 53 controls the paper feed unit 150 and conveys a paper stored in any of the three paper feed trays 151, 152, 153 and the manual paper feed tray 154 as a conveyed object. The conveyance controlling portion 53 selects a tray defined by default or a tray designated by the user as a subject tray from among the three paper feed trays 151, 152, 153 and the manual paper feed tray 154. The conveyance controlling portion 53 controls a pickup roller and a paper feed roller for supplying a paper to the image forming unit 140 from a subject tray among the three paper feed trays 151, 152, 153 and the manual paper feed tray 154. For example, the conveyance controlling portion 53 rotates the pickup roller 151*p* and the paper feed roller 151*r* in the case where the paper feed tray 151 is selected as a subject tray. Further, the conveyance controlling portion 53 rotates the pickup roller 152*p* and the paper feed roller 152*r* in the case where the paper feed tray 152 is selected as a subject tray. Further, the conveyance controlling portion 53 rotates the pickup roller 153*p* and the paper feed roller 153*r* in the case where the paper feed tray 153 is selected as a subject tray. Further, the conveyance controlling portion 53 rotates the pickup roller 153*p* and the paper feed roller 153*r* in the case where the manual paper feed tray 154 is selected as a subject tray. With this control, a conveyed object is conveyed from any of the paper feed trays 151, 152, 153 and the manual paper feed tray 154 to the main conveyance path 41.

The conveyance controlling portion 53 includes a sensor controlling portion 61, a type detecting portion 63, an overlay detecting portion 65, a type storing portion 67, a switching portion 69, a conveyance state judging portion 71, a stop controlling portion 73 and a notifying portion 75. The sensor controlling portion 61 controls the ultrasonic sensor 59, acquires an attenuation rate of an ultrasonic wave and outputs the attenuation rate of the ultrasonic wave to the type detecting portion 63 and the overlay detecting portion 65. The sensor controlling portion 61 acquires an attenuation rate output by the ultrasonic sensor 59 when a conveyed object supplied from the paper feed unit 150 to the main conveyance path 41 by the conveyance controlling portion 53 travels through the detection region of the ultrasonic sensor 59.

In the case where a first detection signal is input from the below-mentioned switching portion 69, the type detecting portion 63 executes a type detection process in response to input of the attenuation rate of the ultrasonic wave from the sensor controlling portion 61. The type detection process is a process of determining a type of a recording medium, which is a conveyed object, based on an attenuation rate of an ultrasonic wave and outputting the determined type of the recording medium to the type storing portion 67. The type of a recording medium includes a paper and an overlay paper. Further, a paper is a plain paper, a wood free paper, a recycled paper or a photo paper. An overlay paper is an envelope, for example. A value that is larger than the maximum value of an attenuation rate of an ultrasonic wave obtained by an experiment in regard to an overlay paper and smaller than the minimum value of an attenuation rate of an ultrasonic wave obtained by an experiment in regard to a paper is prepared as a threshold value. The type detecting portion 63 detects a type of a conveyed object by comparing an attenuation rate of an ultrasonic wave input from the sensor controlling portion 61 with the threshold value. Specifically, if an attenuation rate of an ultrasonic wave input from the sensor controlling portion 61 is equal to or smaller than the threshold value, the type detecting portion 63 judges that a recording medium is an overlay paper. If an attenuation rate of an ultrasonic wave input from the sensor controlling portion 61 is larger than the threshold value, the type detecting portion 63 judges that a recording medium is a paper.

Further, the type detecting portion 63 detects a basis weight of a recording medium, which is a conveyed object, based on an attenuation rate of an ultrasonic wave. The relationship between an attenuation rate of an ultrasonic wave and a basis weight is obtained in advance by an experiment or simulation, and the obtained relationship is maintained. Therefore, the type detecting portion 63 determines a basis weight from an attenuation rate of an ultrasonic wave based on the relationship. Further, the type detecting portion 63 determines a type of a recording medium from a determined basis weight by making reference to a table defining the relationship between a type of a recording medium and a basis weight. The type detecting portion 63 outputs a type of a recording medium to the type storing portion 67. In one or more embodiments, the type detecting portion 63 determines which one of a plain paper, a wood free paper, a recycled paper and a photo paper a type of a conveyed object is based on an attenuation rate of an ultrasonic wave.

The job executing portion 51 includes an image formation controlling portion 55. The image formation controlling portion 55 controls the image forming unit 140 and causes the image forming unit 140 to form an image of printing data in accordance with a print condition. The image formation controlling portion 55 controls the image forming unit 140 such that the transfer roller 47 is electrified to an electric potential that is suitable for transferring a toner image formed on the intermediate transfer belt 57 to a conveyed object on which an image is to be formed based on printing data and a basis weight. Further, the image formation controlling portion 55 determines an image forming condition based on a basis weight and forms an image in accordance with the image forming condition. For example, in the case where a basis weight of a conveyed object is large, an electrification amount of the transfer roller 47 is set higher, and a temperature of the fuser roller 49 is set higher. On the other hand, in the case where a basis weight of a conveyed object is small, an electrification amount of the transfer roller 47 is set lower, and a temperature of the fuser roller 49 is set lower. Further, an image forming condition may include a conveyance speed of a conveyed object required to transfer and fuse a toner image on a paper. For example, in the case where a basis weight of a conveyed object detected by the ultrasonic sensor 59 is large, a conveyance speed of the conveyed object is set lower. In the case where a basis weight of a conveyed object detected by the ultrasonic sensor 59 is small, a conveyance speed of the conveyed object is set higher. A conveyance speed of a conveyed object can be adjusted by control of rotation speeds of a pickup roller, a paper feed roller, the timing roller 45, the transfer roller 47, the fuser roller 49 and the paper discharge roller 15 of the paper feed unit 150.

The type storing portion 67 stores a type of a recording medium input from the type detecting portion 63 in the RAM 114 in association with a subject tray. The type storing portion 67 includes a deleting portion 77. The deleting portion 77 deletes a type of a recording medium associated with a subject tray from the RAM 114 before a first conveyed object, which is a conveyed object that is to be conveyed first, is taken out from the subject tray. The first conveyed object is a conveyed object that is to be conveyed first from a subject tray by the paper feed unit 150.

Specifically, in the case where a subject tray is any of the paper feed trays 151, 152, 153, the first conveyed object is a conveyed object that is to be conveyed first after the subject tray changes from the open state to the close state. The deleting portion 77 detects a change of a state of any of the paper feed trays 151, 152, 153 from the open state to the close state. In the close state, a pickup roller can take out a paper from each of the paper feed trays 151, 152, 153. When the user pulls out each of the paper feed trays 151, 152, 153, each of the paper feed trays 151, 152, 153 changes from the close state to the open state in which papers can be supplied. In the case where each of the paper feed trays 151, 152, 153 changes from the open state to the close state after changing from the close state to the open state, a stored recording medium may be changed to a different type of a recording medium. Therefore, the deleting portion 77 deletes a type of a recording medium that is stored in association with the paper feed tray. Therefore, even in the case where the recording medium stored in a subject tray among the paper feed trays 151, 152, 153 is changed to another type of a recording medium, the type of the recording medium before the change can be prevented from being associated with the subject tray.

In the case where a subject tray is the manual paper feed tray 154, the first conveyed object is a conveyed object that is to be conveyed first from the manual paper feed tray after the manual paper feed tray 154 changes from a state in which a paper is not detected to a state in which a paper is detected. The manual paper feed tray 154 is provided with a sensor that detects absence or presence of a recording medium. Based on output from the sensor, the deleting portion 77 detects a change from a state in which a recording medium stored in the manual paper feed tray 154 is not detected to a state in which a recording medium stored in the manual paper feed tray 154 is detected. A recording medium is not detected by the sensor with the recording medium not stored in the manual paper feed tray 154. In the case where the user supplies a recording medium to the manual paper feed tray 154, the recording medium is detected by the sensor. After the manual paper feed tray 154 changes from a state in which a recording medium is not stored to a state in which a recording medium is stored, the stored recording medium may be changed to another type of a recording medium. When the sensor detects a recording medium from a state of not detecting a recording medium, the deleting portion 77 detects a type of a recording medium that is stored in association with the manual paper feed tray 154. Thus, a type of a recording medium different from a currently stored recording medium can be prevented from being associated with the manual paper feed tray 154.

The first conveyed object is a conveyed object that is to be conveyed first from a subject tray after the MFP 100 recovers from a power saving mode. The MFP 100 switches a behavior mode to either one of a normal mode and the power saving mode in which power consumption is lower than the power consumption in the normal mode. In case of the power saving mode, a sensor for detecting opening and closing of the paper feed trays 151, 152, 153 and a sensor for detecting a recording medium provided in the manual paper feed tray 154 do not behave in order to suppress power consumption. Therefore, in the power saving mode, a recording medium stored in any one of the paper feed trays 151, 152, 153 and the manual paper feed tray 154 may be replaced with another type of a recording medium. The deleting portion 77 deletes a type of a recording medium that is stored in association with a subject tray among the paper feed trays 151, 152, 153 and the manual paper feed tray 154 after the MFP 100 recovers from the power saving mode. Therefore, a type of a recording medium that is different from a currently stored recording medium can be prevented from being associated with any of the paper feed trays 151, 152, 153 and the manual paper feed tray 154 when the MFP 100 recovers from the power saving mode.

Further, the first conveyed object is a conveyed object that is to be conveyed first from a subject tray among the paper feed trays 151, 152, 153 and the manual paper feed tray 154 after the MFP 100 restarts after stopping an image formation behavior due to an error such as paper jam caused by a conveyed object being stuck. During stop of behavior of the MFP 100, a recording medium stored in any of the paper feed trays 151, 152, 153 and the manual paper feed tray 154 may be switched to another type of a recording medium. Therefore, the deleting portion 77 deletes a type of a recording medium that is stored in association with a subject tray among the paper feed trays 151, 152, 153 and the manual paper feed tray 154 when the MFP 100 restarts after stopping an image forming behavior during execution of a job. Therefore, a type different from a type of a currently stored recording medium can be prevented from being associated with any of the paper feed trays 151, 152, 153 and the manual paper feed tray 154 when the MFP 100 restarts after stopping an image forming behavior during execution of a job.

Further, the first conveyed object is a conveyed object that is to be conveyed first from a subject tray in the case where a job to form images of a plurality of pages is executed by the job executing portion 51. The deleting portion 77 judges whether a job to form images of a plurality of pages is executed with reference to a print condition that is set in regard to a job to be executed by the job executing portion 51. In the case where execution of a job is started, the deleting portion 77 deletes a type of a recording medium that is stored in association with a subject tray among the paper feed trays 151, 152, 153 and the manual paper feed tray 154.

In the case where the job executing portion 51 executes a job to form images of a plurality of images, the deleting portion 77 deletes a type of a recording medium associated with a subject tray before a conveyed object that is to be conveyed first is conveyed from the subject tray. However, in the case where a job to be executed by the job executing portion 51 is a predetermined type of a specific job, the deleting portion 77 does not delete a type of a recording medium associated with a subject tray before a conveyed object that is to be conveyed first is conveyed from the subject tray. A specific job is a job with a predetermined set condition. A predetermined condition is a condition that defines a type of a recording medium on which an image is to be formed. For example, a specific job is a print job that is generated by an application program for printing addresses on envelopes. Further, a specific job is a print job in which the manual paper feed tray 154 is designated. This is because it is not necessary to update a type of a recording medium in association with a subject tray since a type of a recording medium is defined in a specific job in this manner.

Further, in the case where the job executing portion 51 executes a job to form images of a plurality of pages, when a conveyed object that is to be conveyed first is conveyed, the deleting portion 77 deletes a type of a recording medium associated with a subject tray. However, in the case where a job to be executed by the job executing portion 51 provides an instruction for switching the subject tray, the deleting portion 77 does not delete a type of a recording medium associated with a subject tray after the switch after the subject tray is switched. This is due to the following reason. In the case where a job to be executed by the job executing portion 51 has provided an instruction for switching a subject tray, the subject tray is switched automatically. However, the type of a recording medium stored in either of the subject trays before and after the switch is the same. In the case where a type of a recording medium is not associated with the subject tray after the switch, a type of a recording medium associated with the subject tray before the switch is associated with the subject tray after the switch.

Further, in the case where the job executing portion 51 executes a job to form images of a plurality of pages, the deleting portion 77 deletes a type of a recording medium associated with a subject tray before a conveyed subject that is to be conveyed first is conveyed. However, in the case where the cumulative rotation count of a pickup roller corresponding to the subject tray is equal to or larger than a predetermined rotation count, the deleting portion 77 does not delete a type of a recording medium associated with a subject tray before the conveyed object that is to be conveyed first is conveyed. A cumulative rotation count of a pickup roller is the number of rotations that has been cumulatively counted since manufacture of the MFP 100. This is because a pickup roller wears by use, a friction force between the pickup roller and a recording medium is reduced, and probability of taking out a plurality of recording media at a time is high.

The overlay detecting portion 65 receives an attenuation rate of an ultrasonic wave from the sensor controlling portion 61 and receives a type of a recording medium stored in a subject tray from the type storing portion 67. In the case where a second detection signal has not been received from the switching portion 69, described below, the overlay detecting portion 65 executes an overlay detection process in response to input of an attenuation rate of an ultrasonic wave from the sensor controlling portion 61. In other words, in the case where the second detection signal has not been received from the switching portion 69, the overlay detecting portion 65 does not execute the overlay detection process. However, in the case where the second detection signal has been received from the switching portion 69, the overlay detecting portion 65 executes the overlay detection process. The overlay detection process is a process of judging whether a conveyed object is in the overlay state in which a gap is present based on an attenuation rate of an ultrasonic wave with reference to a type of a recording medium. In the case where a conveyed object is in the overlay state, the conveyed object has a gap formed between a plurality of recording media. Therefore, the overlay detecting portion 65 determines whether a conveyed object is in the overlay state by comparing an attenuation rate of an ultrasonic wave that is input from the sensor controlling portion 61 with the threshold value. Specifically, a value that is smaller than a minimum value of an attenuation rate of an ultrasonic wave obtained by an experiment is prepared as a threshold value in regard to a type of a recording medium. If an attenuation rate of an ultrasonic wave input from the sensor controlling portion 61 is equal to or smaller than the threshold value defined with respect to the type of the recording medium of a conveyed object, the overlay detecting portion 65 judges that the conveyed object is in the overlay state. If the attenuation rate of the ultrasonic wave input from the sensor controlling portion 61 is larger than the threshold value, the overlay detecting portion 65 judges that the conveyed object is not in the overlay state. The overlay detecting portion 65 outputs a result of detection to the conveyance state judging portion 71.

The switching portion 69 causes either one of the type detection process and the overlay detection process to be executed. In other words, the switching portion 69 activates either one of the type detecting portion 63 and the overlay detecting portion 65. A first detection signal is output to the type detecting portion 63 during a period in which a type of a recording medium is not stored in the RAM 114 in association with a subject tray. A second detection signal is output to the overlay detecting portion 65 during a period in which a type of a recording medium is stored in the RAM 114 in association with a subject tray. Further, the switching portion 69 may switch the output destination of the sensor controlling portion 61 to the type detecting portion 63 during a period in which a type of a recording medium is not stored in the RAM 114 in association with a subject tray. The switching portion 69 may switch the output destination of the sensor controlling portion 61 to the overlay detecting portion 65 during a period in which a type of a recording medium is stored in the RAM 114 in association with a subject tray. In this case, the type detecting portion 63 executes the type detection process in response to input of an attenuation rate of an ultrasonic sensor from the sensor controlling portion 61 regardless of presence or absence of input of a first detection signal. The overlay detecting portion 65 executes the overlay detection process in response to input of an attenuation rate of an ultrasonic wave from the sensor controlling portion 61 regardless of presence or absence of input of a second detection signal.

In the case where the job executing portion 51 executes a job to form images of a plurality of pages, and a conveyed object is conveyed first from a subject tray, when the type detecting portion 63 is activated by the switching portion 69, the conveyance controlling portion 53 sets a pressing force of a pickup roller to a first pressing force and sets a conveyance speed of a conveyed object to a first conveyance speed. In the case where the job executing portion 51 executes a job to form images of a plurality of pages, and a conveyed object is conveyed first from a subject tray, when the overlay detecting portion 65 is activated by the switching portion 69, the conveyance controlling portion 53 sets a pressing force of a pickup roller to a second pressing force and sets a conveyance speed of a conveyed object to a second conveyance speed. Further, in the case where a conveyed subject is taken out second or later from the subject tray, the conveyance controlling portion 53 sets a pressing force of a pickup roller to the second pressing force, and sets a conveyance speed of the conveyed object to the second conveyance speed. The first pressing force is larger than the second pressing force. Further, the first conveyance speed is lower than the second conveyance speed. Thus, the friction force between a conveyed object that is to be conveyed first and the pickup roller can be larger than the friction force between the conveyed object that is to be conveyed second or later and the pickup roller, probability of double feeding of the conveyed object that is to be conveyed first can be lowered. Further, because the first conveyance speed is lower than the second conveyance speed, accuracy of the type detection process can be enhanced.

Whether a conveyed object is in the overlay state is input to the conveyance state judging portion 71 from the overlay detecting portion 65, and a type of a recording medium associated with a subject tray is input to the conveyance state judging portion 71 from the type storing portion 67. The conveyance state judging portion 71 determines a conveyance state based on whether a conveyed object is in the overlay state with reference to a type of a recording medium associated with a subject tray. A conveyance state represents either a normal state or an abnormal state. Specifically, in the case where a type of a recording medium associated with a subject tray is a paper, and a conveyed object is not in the overlay state, the conveyance state judging portion 71 determines that the conveyance state is normal. In the case where a type of a recording medium associated with a subject tray is a paper, and a conveyed object is in the overlay state, the conveyance state judging portion 71 determines that the conveyance state is abnormal. Further, in the case where a type associated with a subject tray is an overlay paper, when a conveyed object is in the overlay state, the conveyance state judging portion 71 determines that the conveyance state is normal. In regard to a conveyed object a recording medium type of which is an overlay paper, a threshold value between an attenuation rate of an ultrasonic wave in regard to one overlay paper and an attenuation rate of an ultrasonic wave in regard to two overlay papers overlaid on each other can be defined as a threshold value for an overlay paper. In this case, the threshold value for an overlay paper is obtained by an experiment or simulation. In the case where an attenuation rate of an ultrasonic wave acquired by the sensor controlling portion 61 is equal to or larger than the threshold value for an overlay paper, the conveyance state judging portion 71 determines that the conveyance state is normal. In the case where an attenuation state of an ultrasonic wave acquired by the sensor controlling portion 61 is smaller than the threshold value for an overlay paper, the conveyance state judging portion 71 determines that the conveyance state is abnormal.

In the case where the conveyance state judging portion 71 determines that the conveyance state is abnormal, the stop controlling portion 73 stops conveyance of a conveyed object by the paper feed unit 150. Thus, because formation of an image on a double fed conveyed object can be prevented, an occurrence of an error such as paper jam caused by a conveyed object being stuck, etc. can be prevented, and the image forming unit 140 can be prevented from being damaged and malfunctioning. For example, a conveyed object can be prevented from being stuck in a conveyance path. Further, overloading of the image forming unit 140 due to formation of an image with a conveyed object being stuck can be prevented, and the image forming unit 140 can be prevented from malfunctioning due to overloading.

In the case where conveyance of a conveyed object is stopped by the stop controlling portion 73, the notifying portion 75 notifies the user. For example, an error message is displayed in the display unit 161. Further, in the case where a job executed by the job executing portion 51 is a print job received from an external computer, a message is transmitted to a PC that has transmitted the print job. Thus, because a user who has provided an instruction for executing a job can be notified of interruption of a job, the user can work on removing a conveyed object from the conveyance path, etc. and can resolve the interruption of the job early.

Figure 6:
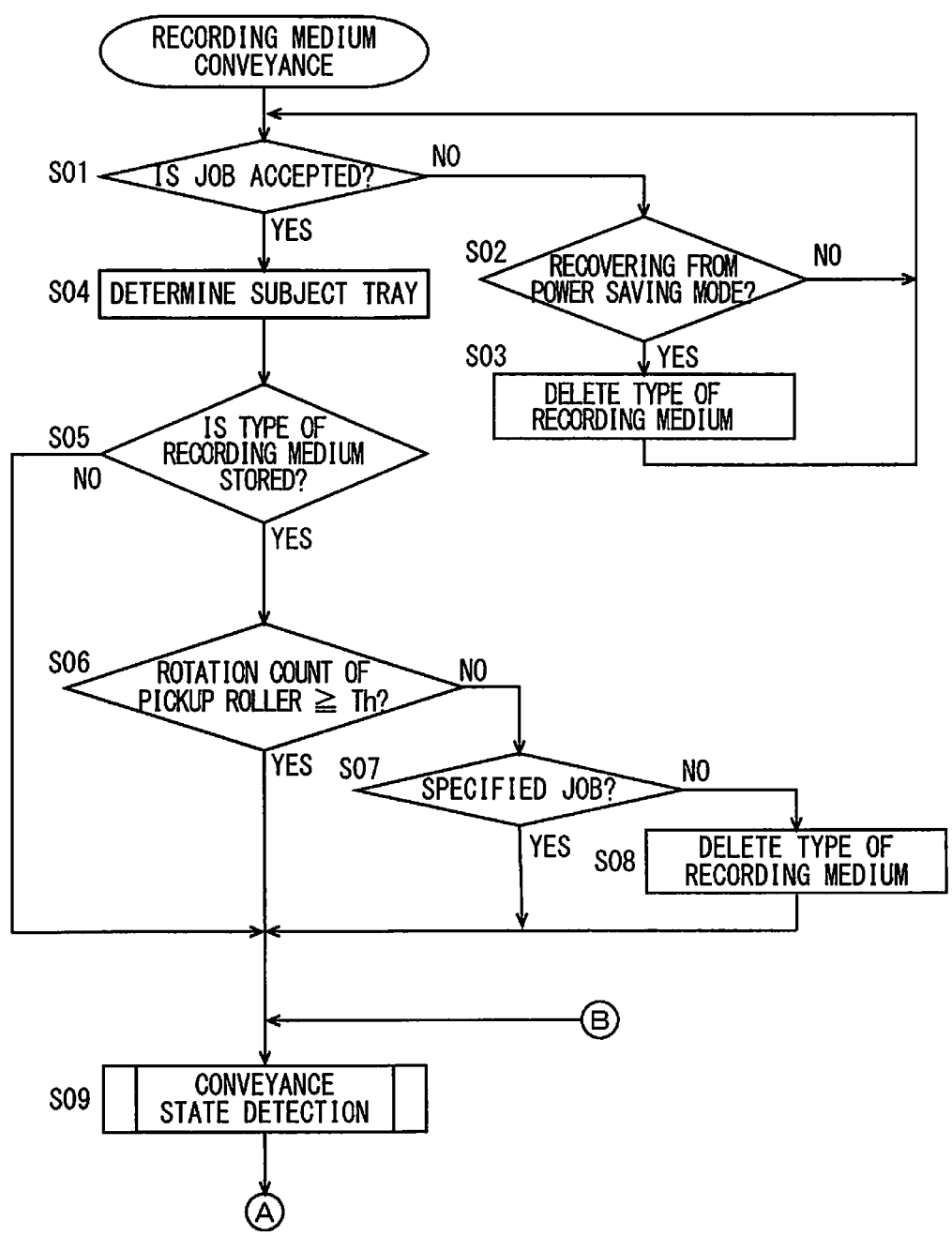
FIG. 6 is a first flowchart showing one example of a flow of a recording medium conveyance process.
Figure 7:
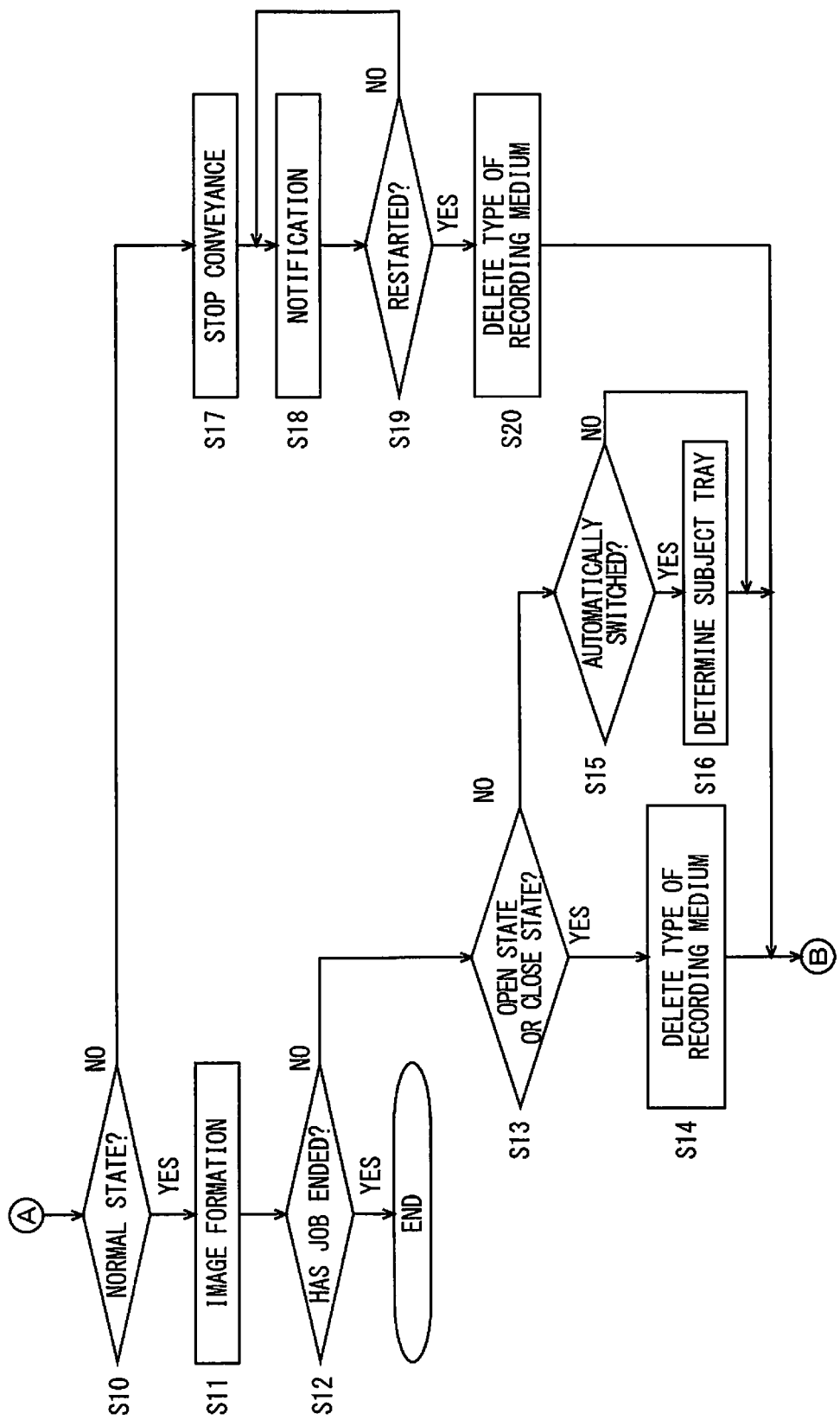
FIG. 7 is a second flowchart showing the one example of the flow of the recording medium conveyance process.

FIGS. 6 and 7 are flowcharts showing one example of a flow of a recording medium conveyance process. The recording medium conveyance process is a process executed by the CPU 111 in the case where the CPU 111 included in the MFP 100 executes the recording medium conveyance instructions. With reference to FIGS. 6 and 7, the CPU 111 included in the MFP 100 judges whether a job has been accepted (step S01). If a job has been accepted, the process proceeds to the step S04. If not, the process proceeds to the step S02.

In the step S02, whether the MFP 100 is recovering from a power saving mode is judged. If a behavior mode is recovered from the power saving mode, the process proceeds to the step S03. If not, the process returns to the step S01. A type of a recording medium stored in the RAM 114 in association with each of the paper feed trays 151, 152, 153 and the manual paper feed tray 154 is deleted in the step S02, and the process returns to the step S01.

In the step S04, a subject tray is determined, and the process proceeds to the step S05. A tray designated by the user or a tray defined by default from among the paper feed trays 151, 152, 153 and the manual paper feed tray 154 is determined as a subject tray.

In the step S05, whether a type of a recording medium is stored in association with the subject tray is judged. Whether a type of a recording medium is stored in the RAM 114 in association with the subject tray is judged. If a type of a recording medium is stored in association with a subject tray, the process proceeds to the step S06. If not, the process proceeds to the step S09. In the step S06, whether the cumulative rotation count of a pickup roller corresponding to the subject tray is equal to or larger than a threshold value Th is judged. If the cumulative rotation count of the pickup roller corresponding to the subject tray is equal to or larger than the threshold value Th, the process proceeds to the step S09. If not, the process proceeds to the step S07. In the step S07, whether the job accepted in the step S01 is a specified job is judged. If the job is a specified job, the process proceeds to the step S09. If not, the process proceeds to the step S08. A type of a recording medium stored in the RAM in association with a subject tray is deleted in the step S08, and the process proceeds to the step S09.

A conveyance state detection process is executed in the step S09, and the process proceeds to the step S10. While details will be described below, the conveyance state detection process is a process of detecting a conveyance state of a conveyed object. The conveyance state includes a normal state and an abnormal state.

In the step S10, the process branches in accordance with a result of the conveyance state detection process. If the conveyance state of a conveyed object is normal, the process proceeds to the step S11. If not, the process proceeds to the step S17. An image is formed on the conveyed object in the step S11, and the process proceeds to the step S12. Specifically, image formation is started by the image forming unit 140. The timing roller 45 starts rotating, and the conveyed object is conveyed. In the step S12, whether a job has ended is judged. If the job has ended, the process ends. If not, the process proceeds to the step S13.

In the step S13, whether the subject tray has changed from the open state to the close state is judged. If the subject tray has changed from the open state to the close state, the process proceeds to the step S14. If not, the process proceeds to the step S15. A type of a recording medium stored in the RAM 114 in association with the subject tray is deleted in the step S14, and the process returns to the step S09.

In the step S15, whether the subject tray has been switched automatically is judged. For example, in the case where a job provides an instruction for switching a tray, the subject tray is automatically switched. If the subject tray has been automatically switched, the process proceeds to the step S16. If not, the process returns to the step S09. A tray after the switch is determined as a subject tray in the step S16, and the process returns to the step S07. In the case where the tray after the switch is not associated with a type of a recording medium, a type of a recording medium associated with the subject tray before the switch is associated with the tray after the switch and stored in the RAM 114.

The process proceeds to the step S17 in the case where it is judged that the conveyance state of a conveyed object is abnormal. Conveyance of the conveyed object is stopped in the step S17, and the process proceeds to the step S18. The timing roller 45 stops rotating. Thus, conveyance of the conveyed object is stopped before an image is formed on the conveyed object. The user is notified of stop of conveyance of the conveyed object in the step S18, and the process proceeds to the step S19. In the step S19, the user resolves abnormality by removing the conveyed object from a conveyance path, etc. and whether conveyance has restarted is judged. If conveyance has restarted, the process proceeds to the step S20. If not, the process returns to the step S18. A type of a recording medium stored in the RAM 114 in association with a subject tray is deleted in the step S20, and the process returns to the step S09.

Figure 8:
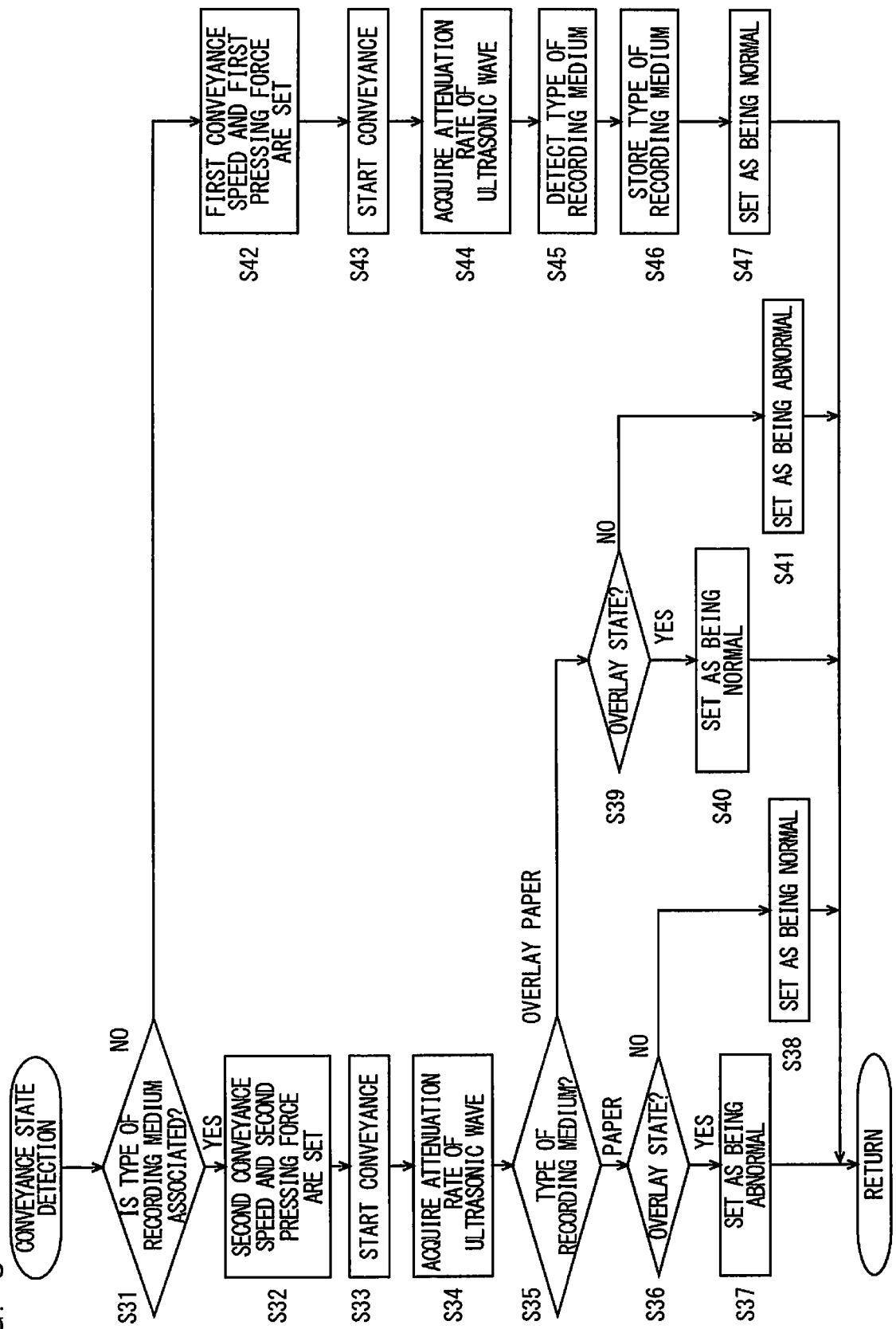
FIG. 8 is a flowchart showing one example of a flow of a conveyance state detection process.

FIG. 8 is a flowchart showing one example of a flow of the conveyance state detection process. The conveyance state detection process is a process executed in the step S09 in the recording medium conveyance process. A subject tray is determined before the conveyance state detection process is executed. With reference to FIG. 8, whether a type of a recording medium is stored in the RAM 114 in association with the subject tray is judged in the step S31. If a type of a recording medium is stored in association with the subject tray, the process proceeds to the step S32. If not, the process proceeds to the step S42. The second conveyance speed and the second pressing force are set in the step S32, and the process proceeds to the step S33. Conveyance of a recording medium is started from the subject tray in the step S33, and the process proceeds to the step S34.

An attenuation rate of an ultrasonic wave is acquired in the step S34, and the process proceeds to the step S35. In the step S35, the process branches in accordance with a type of a recording medium stored in the RAM 114 in association with the subject tray. If the type of the recording medium is a paper, the process proceeds to the step S36. If the type of the recording medium is an overlay paper, the process proceeds to the step S39. In the step S36, whether the conveyed object is the overlay state is judged based on the attenuation rate of the ultrasonic wave acquired in the step S34. If the conveyed object is in the overlay state, the process proceeds to the step S37. If not, the process proceeds to the step S38. In the step S37, the conveyance state is set as being abnormal, and the process returns to the recording medium conveyance process. In the step S38, the conveyance state is set as being normal, and the process returns to the recording medium conveyance state.

In the step S39, whether the conveyed object is in the overlay state is judged based on the attenuation rate of the ultrasonic wave acquired in the step S34. If the conveyed object is in the overlay state, the process proceeds to the step S40. If not, the process proceeds to the step S41. In the step S40, the conveyance state is set as being normal, and the process returns to the recording medium conveyance process. In the step S41, the conveyance state is set as being abnormal, and the process returns to the recording medium conveyance process.

The first conveyance speed and the first pressing force are set in the step S42, and the process proceeds to the step S43. Conveyance of a recording medium is started from the subject tray in the step S43, and the process proceeds to the step S44. An attenuation rate of an ultrasonic wave is acquired in the step S44, and the process proceeds to the step S45. A type of a recording medium is detected based on the attenuation rate of the ultrasonic wave in the step S45, and the process proceeds to the step S46. If the attenuation rate is equal to or smaller than a threshold value, an overlay paper is detected as a type of the recording medium. If the attenuation rate is larger than the threshold value, a paper is detected as a type of the recording medium. In the step S46, the type of the recording medium is stored in association with the subject tray, and the process proceeds to the step S47. In the step S47, the conveyance state is set as being normal, and the process returns to the recording medium conveyance state.

Modified Example

Figure 9:
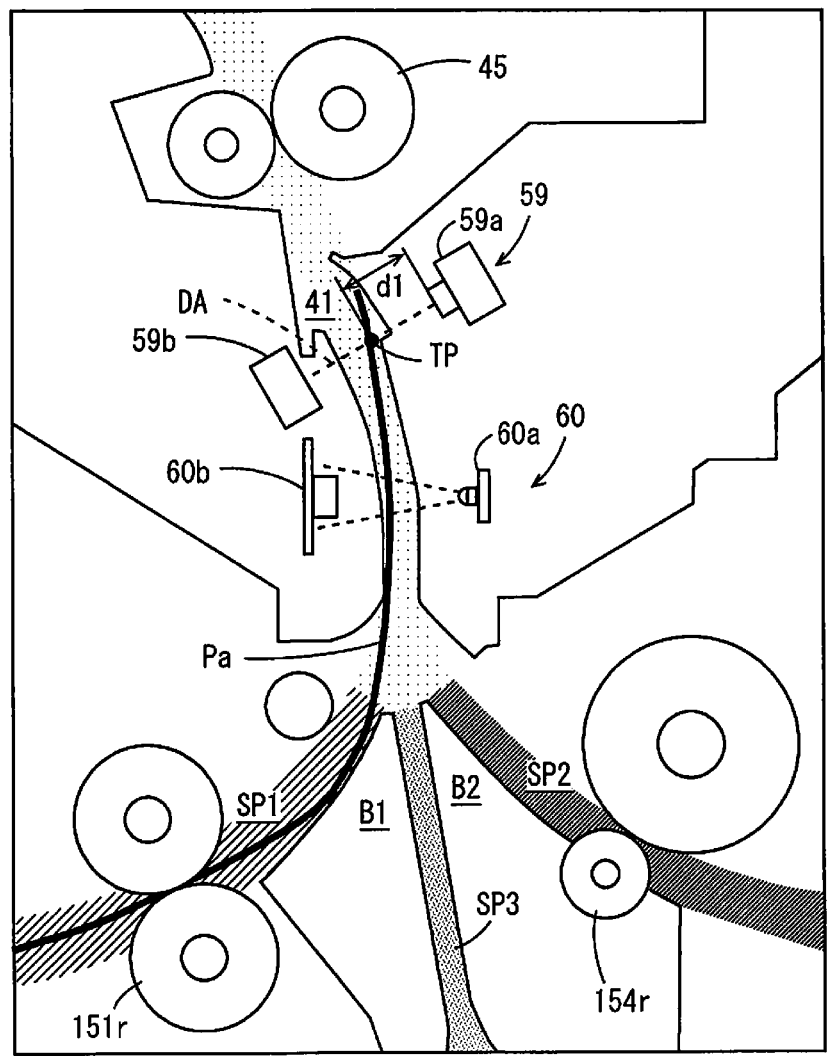
FIG. 9 is a side view showing a detection region in a conveyance path of an MFP in a modified example according to one or more embodiments.

FIG. 9 is a side view showing a light detection region in a conveyance path of an MFP in the modified example. FIG. 9 is different from FIG. 4 in that an optical sensor 60 is added. The optical sensor 60 includes a light emitter 60a and a light receiver 60b and is transmissive. The optical sensor 60 is arranged at a position farther upstream than the ultrasonic sensor 59 between the lower end 30 of the main conveyance path 41 and the timing roller 45. The optical sensor 60 is arranged such that the light emitter 60a and the light receiver 60b are opposite to each other with the main conveyance path 41 provided therebetween. A conveyed object is detected in a region of the main conveyance path 41 between the light emitter 60a and the light receiver 60b. While a transmissive optical sensor is shown as the optical sensor by way of example, the optical sensor may be reflective. Further, a transmissive optical sensor and a reflective optical sensor may be combined. A basis weight can be detected by the optical sensor 60.

In the MFP 100 in the modified example, a type and an overlay state of a conveyed object is detected by the combination of the ultrasonic sensor 59 and the optical sensor 60.

Not only judgment of a type of a conveyed object but also detection of a type and a basis weight of the conveyed object can be executed at the same time by the combination of the optical sensor 60 and the ultrasonic sensor 59. Thus, user friendliness is improved. In the case where the type of a conveyed object is stored in the RAM 114, the optical sensor 60 may be used as a timing sensor for detecting presence or absence of a paper. Further, detection of a basis weight by the optical sensor 60 and the detection of an overlay state by the ultrasonic sensor 59 can be executed in parallel.

As described above, the MFP 100 in one or more embodiments functions as a recording medium conveyance device, includes the paper feed trays 151, 152, 153 and the manual paper feed tray 154 that store recording media, takes out a recording medium stored in a storage and conveys the recording medium as a conveyed object. Further, the MFP 100 includes the ultrasonic sensor 59 that outputs a value indicating an attenuation amount of an ultrasonic wave caused by a conveyed object, and executes the overlay detection process and the type detection process based on a result of output of the ultrasonic sensor 59. The type detection process is executed in the case where the type of a recording medium is not stored in the RAM 114. In the case where the type is stored in the RAM 114, the overlay detection process is executed. Therefore, because the overlay state is not detected with a type of a conveyed object not detected, the conveyed object can be prevented from being erroneously judged as being in the overlay state. Specifically, an overlay paper such as an envelope can be prevented from being judged as being double fed.

Further, the MFP 100 judges a conveyance state of a conveyed object that is to be conveyed by the paper feed unit 150 based on a type stored in the RAM 114 and a result of the overlay detection process. Therefore, whether the conveyed object is conveyed normally can be judged.

Further, because the MFP 100 deletes a type stored in the RAM 114, in the case where a recording medium stored in any of the paper feed trays 151, 152, 153 and the manual paper feed tray 154 is changed to another type of a recording medium, erroneous judgment can be prevented.

Further, in the MFP 100, each of the paper feed trays 151, 152, 153 can change between an open state in which each of the paper feed trays 151, 152, 153 is opened in order to store a recording medium and a close state in which the recording medium can be conveyed by a pickup roller. The type stored in the RAM 114 is deleted in response to a change of a state of each of the paper feed trays 151, 152, 153 from the open state to the close state. Thus, even in the case where a type of a stored recording medium is different before and after the opening and closing of a subject tray, the user is not required to set information relating to the recording medium stored in the subject tray such as a type of the recording medium.

Further, the MFP 100 deletes a type which is stored in the RAM 114 before a job is executed. Thus, even in the case where a recording medium stored in a subject tray is changed to another type of a recording medium before a job is executed, the user is not required to set information relating to the recording medium stored in the subject tray such as a type of the recording medium.

Further, in the case where a job is a specific job that is to be executed under a predetermined condition, the MFP 100 does not delete a type stored in the RAM 114. In case of a specific job, a type of a recording medium is specified.

Therefore, the type detection process is prevented from being executed, and the overlay state is detected. Therefore, detection of an overlay state can be started with a paper that is to be conveyed first.

Further, in the case where restarting after stopping a job during execution of the job, the MFP 100 does not delete a type stored in the RAM 114. In the case where a job is stopped during execution of the job, a type of a recording medium is not changed. Therefore, detection of an overlay state can be started with a paper that is to be conveyed first after restart.

Further, in the case where the rotation count of a pickup roller for conveying a conveyed object is equal to or larger than a predetermined value, the MFP 100 does not delete a type stored in the RAM 114. In the case where the rotation count of a pickup roller is equal to or larger than a predetermined value, probability of double feeding is high. Therefore, detection of an overlay state can be started with a paper on which a job is to be executed first.

Further, the MFP 100 causes the ultrasonic sensor 59 to function as a position detection sensor that detects a position of a conveyed object. Thus, it is not necessary to separately provide a sensor for detecting a position of a conveyed object.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A recording medium conveyance device comprising:
    a storage;
    a conveyer that conveys an object;
    an ultrasonic sensor that outputs a value indicating an attenuation amount of an ultrasonic wave caused by the conveyed object; and
    a hardware processor that:
        determines whether a type of the conveyed object is stored in the storage;
        upon determining that the type is not stored in the storage, switches to a type detection process of detecting the type based on output of the ultrasonic sensor and storing the type in the storage;
        upon determining that the type is stored in the storage, switches to an overlay detection process of detecting whether the conveyed object is in an overlay state in which a gap is present based on output of the ultrasonic sensor; and
        determines whether a conveyance state of the conveyed object is normal or abnormal based on the type and whether the conveyed object is in the overlay state.

2. The recording medium conveyance device according to claim 1, wherein the hardware processor further deletes the type stored in the storage.

3. The recording medium conveyance device according to claim 2, further comprising:
    a container that contains a recording medium, wherein
    the conveyer takes out the recording medium contained in the container and conveys the recording medium as the conveyed object,
    the container changes between an open state in which the container is opened in order to contain the recording medium and a close state in which the recording medium is conveyable by the conveyer, and the hardware processor deletes the type stored in the storage in response to a change of a state of the container from the open state to the close state.

4. The recording medium conveyance device according to claim 3, wherein a plurality of the containers is present, and the storage stores the type of each of the plurality of the containers.

5. The recording medium conveyance device according to claim 2, wherein the hardware processor further:
executes a job to form an image on the conveyed object that has been conveyed by the conveyer; and
deletes the type stored in the storage before the job is executed.

6. The recording medium conveyance device according to claim 1, wherein the hardware processor deletes the type stored in the storage when a job is to be executed except in a case where the job is to be executed under a predetermined condition.

7. The recording medium conveyance device according to claim 1, wherein the hardware processor deletes the type stored in the storage except in a case where restarting after stopping a job during execution.

8. The recording medium conveyance device according to claim 5, wherein
the conveyer includes a roller for conveying the conveyed object, and
the hardware processor, even in a case where the job is to be executed, when the type is stored in the storage and a rotation count of the roller is equal to or larger than a predetermined value, does not delete the type stored in the storage.

9. The recording medium conveyance device according to claim 1, wherein the hardware processor further detects a position of the conveyed object conveyed by the conveyer based on output of the ultrasonic sensor.

10. A recording medium conveyance method executed in an image forming apparatus, the method comprising:
determining whether a type of an object, conveyed by a conveyor of the image forming apparatus, is stored in a storage of the image forming apparatus;
upon determining that the type is not stored in the storage, switching to a type detection process of detecting the type based on output of an ultrasonic sensor of the image forming apparatus and storing the type in the storage, wherein the ultrasonic sensor indicates an attenuation amount of an ultrasonic wave caused by the conveyed object;
upon determining that the type is stored in the storage, switching to an overlay detection process of detecting whether the conveyed object is in an overlay state in which a gap is present based on a result of output of the ultrasonic sensor; and
determining whether a conveyance state of the conveyed object is normal or abnormal based on the type and whether the conveyed object is in the overlay state.

11. The recording medium conveyance method according to claim 10, further comprising:
deleting the type stored in the storage.

12. The recording medium conveyance method according to claim 11, further comprising:
taking out a recording medium contained in a container of the image forming apparatus and conveying the recording medium as the conveyed object;
changing a state of the container between an open state in which the container is opened in order to contain the recording medium and a close state in which the recording medium is conveyable by the conveyer; and the deleting deletes the type stored in the storage in response to a change of a state of the container from the open state to the close state.

13. The recording medium conveyance method according to claim 12, wherein
the storage stores a type of each of a plurality of containers of the image forming apparatus.

14. The recording medium conveyance method according to claim 11, further comprising:
executing a job to form an image on the conveyed object, wherein
the deleting deletes the type stored in the storage before the job is executed to form the image.

15. The recording medium conveyance method according to claim 10, further comprising:
deleting the type stored in the storage when a job is to be executed in the job to form the image except in a case where the job is to be executed to from the image under a predetermined condition.

16. The recording medium conveyance method according to claim 10, further comprising:
deleting the type stored in the storage except in a case where restarting after stopping a job during execution of the job to form the image.

17. The recording medium conveyance method according to claim 14, wherein
the conveyer includes a roller for conveying the conveyed object, and
even in a case where the job is to be executed to from the image, when the type is stored in the storage and a rotation count of the roller is equal to or larger than a predetermined value, the deleting does not delete the type stored in the storage.

18. The recording medium conveyance method according to claim 10, further including:
detecting a position of the conveyed object conveyed by the conveyer based on output of the ultrasonic sensor.

19. A non-transitory computer-readable recording medium encoded with recording medium conveyance instructions executed by a computer that controls an image forming apparatus,
the image forming apparatus comprising:
a storage;
a conveyer that conveys an object; and
an ultrasonic sensor that outputs a value indicating an attenuation amount of an ultrasonic wave caused by the conveyed object, and
the recording medium conveyance instructions causing the computer to:
determine whether a type of the conveyed object is stored in the storage;
upon determining that the type is not stored in the storage, switch to a type detection process of detecting the type based on a result of output of the ultrasonic sensor and executing a type detection process of storing the type in the storage;
upon determining that the type is stored in the storage, switch to an overlay detection process of detecting whether the conveyed object is in an overlay state in which a gap is present based on a result of output of the ultrasonic sensor; and
determine whether a conveyance state of the conveyed object is normal or abnormal based on the type and whether the conveyed object is in the overlay state.

* * * * *